United States Patent [19]

Kemper

[11] 4,369,667

[45] Jan. 25, 1983

[54] TRACTION SURFACE COOLING METHOD AND APPARATUS

[75] Inventor: Yves J. Kemper, Birmingham, Mich.

[73] Assignee: Vadetec Corporation, Troy, Mich.

[21] Appl. No.: 282,233

[22] Filed: Jul. 10, 1981

[51] Int. Cl.³ .................. F16H 15/16; F16H 57/04; F16H 15/50

[52] U.S. Cl. ......................... 74/191; 74/192; 74/467; 74/796; 184/6.12

[58] Field of Search ............... 74/191, 193, 212, 467, 74/468, 796; 184/6.12

[56] References Cited

U.S. PATENT DOCUMENTS

| | | | |
|---|---|---|---|
| Re. 30,981 | 6/1982 | Kemper | 74/193 |
| 1,971,781 | 8/1934 | Henderson et al. | 184/11 |
| 2,240,148 | 4/1941 | Schmitter et al. | 74/796 |
| 2,706,916 | 4/1955 | Graham | 74/796 |
| 2,966,381 | 12/1960 | Menzel | 308/77 |
| 2,982,145 | 5/1961 | Orner | 74/424.8 |
| 3,347,106 | 10/1967 | Flichy | 74/199 |
| 3,677,109 | 7/1972 | Stuemky | 74/796 |
| 3,793,910 | 2/1974 | Nasvytis | 74/796 |
| 4,233,851 | 11/1980 | Kemper | 74/191 |
| 4,233,859 | 11/1980 | Kemper | 74/191 |
| 4,235,127 | 11/1980 | Kemper | 74/796 |
| 4,258,581 | 3/1981 | Kemper et al. | 74/212 |
| 4,277,982 | 7/1981 | Kemper | 74/191 |
| 4,296,647 | 10/1981 | Kemper | 74/191 |

Primary Examiner—Leslie A. Braun
Assistant Examiner—Joseph M. Rolnicki
Attorney, Agent, or Firm—Ziems and Walter

[57] ABSTRACT

A traction surface cooling method and apparatus for traction drive transmissions capable of continuous speed ratio variation in which a traction lubricant is circulated over a defined sector of a traction surface spaced from the point of rolling frictional contact of that surface with a cooperating traction surface. Provision is made for wiping the traction surface at the leading end of the sector to cleanse the surface of lubricant for more effective heat transfer from the surface to freshly circulated lubricant, and at the trailing end of the sector for preventing an excessively thick film of lubricant on the surface proceeding to the contact point.

15 Claims, 7 Drawing Figures

TRACTION SURFACE COOLING METHOD AND APPARATUS

BACKGROUND OF THE INVENTION

This invention relates to traction drive torque transmissions and more particularly, it concerns improvements in the cooling and lubrication of traction surfaces of such transmissions.

In a commonly assigned U.S. Pat. No. 4,235,127, issued Nov. 25, 1980 to the present inventor, a traction surface cooling system for continuously variable torque transmissions is disclosed in which a traction surface lubricant is circulated into contact with the rolling traction surfaces in a manner to improve cooling. The traction surfaces are wiped either by blades or pads to remove boundary surface layers of the lubricant in a manner to enhance the transfer of heat from the surface to the lubricant.

Although the cooling system disclosed in the aforementioned patent is applicable to many diverse types of traction drive transmissions by which torque is transmitted between rolling surfaces retained against one another under high normal forces, it has been tested extensively with the type of transmission represented by the embodiment disclosed in the patent. In such transmissions, a nutatable beta body of biconical configuration is carried by a rotatable alpha body so that oppositely convergent conical surfaces on the beta body engage interior ring surfaces concentric with the axis of the alpha body at two diametrically opposite points of contact. The alpha body is in the nature of a truncated cylinder having a pair of frusto-conical pocketlike cavities to receive the conical portions of the beta body. To cool the conical surfaces of the beta body, the circulated lubricant is introduced in sufficient quantity to substantially flood the clearance space between the alpha body pockets and the conical surfaces. Because the internal traction surfaces on the rings are located outwardly of both the alpha body and the biconical beta body, cooling lubricant circulated to these surfaces is not as well defined and is primarily excess lubricant thrown outwardly by the rotating alpha and beta bodies. Both surfaces are wiped simultaneously with the circulation of lubricant to enhance heat exhange contact of lubricant with the surfaces.

Temperature monitoring of operating transmissions of the general type disclosed in the aforementioned patent has revealed that heat transfer from the pocketed conical surfaces on the beta body substantially exceeds the rate of heat transfer from the internal traction surfaces on the rings. The difference in cooling rates is believed due in substantial measure to the difference in the quantity of coolant circulated about the conical surfaces as compared with that brought into contact with the ring surfaces. Because the rings move axially in the transmission frame or housing and are both axially movable and rotatable relative to the alpha body in speed ratio varying operation of the transmission, however, a serious problem is presented in increasing the amount of coolant flow to the rings. There is a need, therefore, for a solution to this problem in transmissions of the type mentioned as well as in traction drive transmissions in general which have a comparable geometry.

SUMMARY OF THE INVENTION

In accordance with the present invention, a traction surface cooling provision is made particularly but not exclusively for internal ring traction surfaces of torque transmissions capable of continuously variable speed ratios, by directing a coolant to the interior of a trough-like member partially enveloping the interior ring cross-section and extending arcuately through a sector of the ring spaced from its point of rolling contact with a cooperating traction surface. The coolant, preferably a traction lubricant, is introduced to the trough near the leading end thereof in the context of trough movement relative to the ring, and passed along the arcuate length between the base of the trough and the traction surface as well as outwardly past the radial edge surfaces of the ring. At the leading end of the trough, the ring is scraped or wiped to cleanse the ring of lubricant prior to the point at which fresh lubricant is circulated into the trough. Also the ring is wiped or scraped at the trailing end of the trough to reduce the traction lubricating film on the ring to an amount proper for high rolling traction efficiencies.

A principal object of the present invention is, therefore, the provision of an improved traction surface cooling method and apparatus particularly adapted to ring defined internal traction surfaces. Other objects and further scope of applicability of the present invention will become apparent from the detailed description to follow taken in conjunction with the accompanying drawings in which like reference numerals designate like parts.

DETAILED DESCRIPTION OF THE PREFERRED EMBODIMENT

Figure 1:
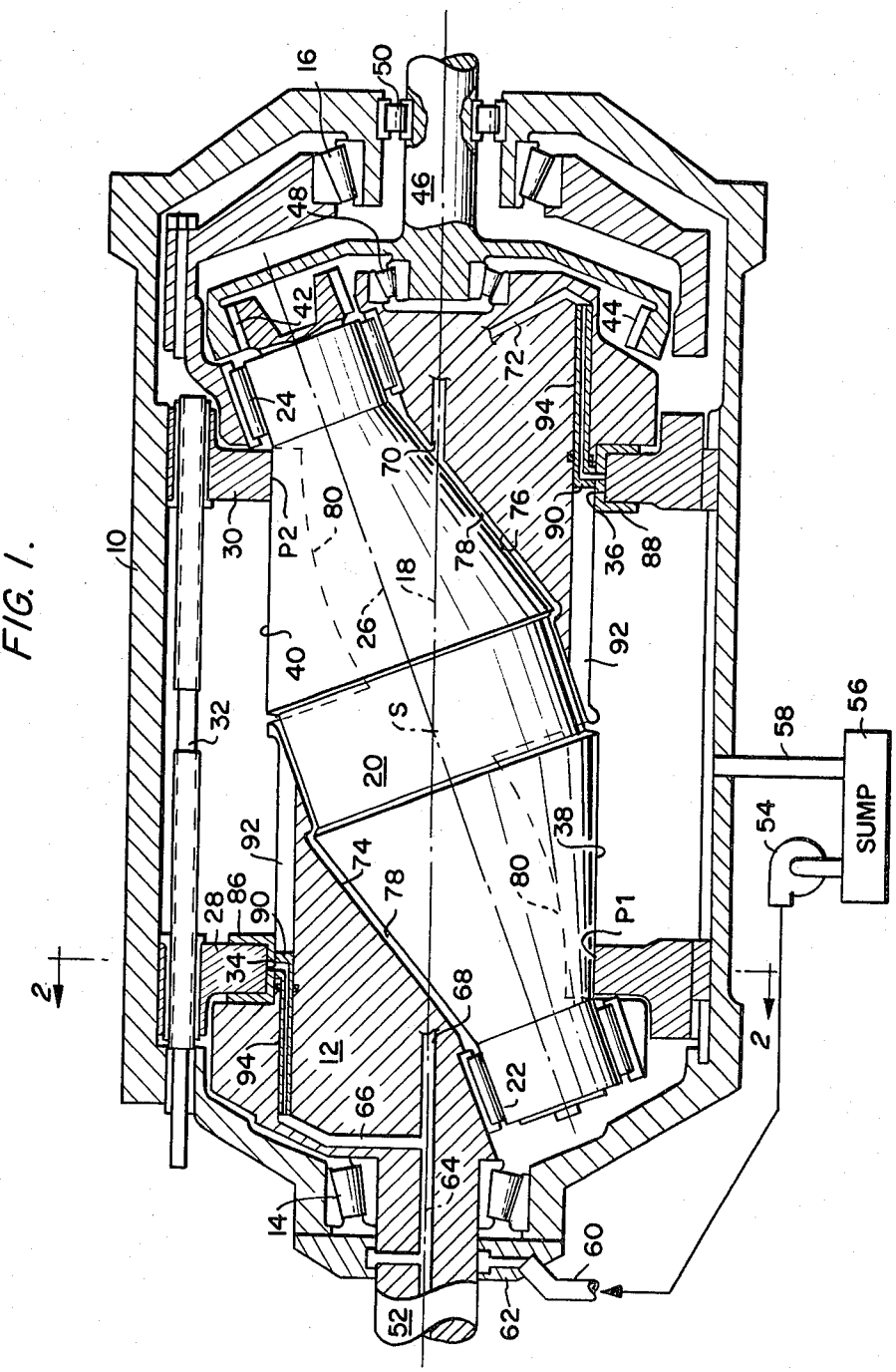
FIG. 1 is a longitudinal cross-section through a continuously variable traction drive transmission incorporating the present invention.

In FIG. 1 of the drawing, the major working components of a continuously variable speed ratio transmission incorporating the present invention are shown to include a closed, generally cylindrical housing or frame 10, a crank-like alpha body 12 supported by bearings 14 and 16 for rotation in the frame 10 about a primary transmission axis 18, a biconical beta body 20 supported by bearings 22 and 24 in the alpha body 12 to be concentric with a second axis 26 inclined with respect to and intersecting the primary axis 18 at a point S, and a pair of rings 28 and 30 keyed against rotation with respect to the frame 10 but slidable axially therein by rotation of a double pitched screw 32 projecting from the frame 10 for connection to an appropriate control (not shown). The rings 28 and 30 define circular internal traction surfaces 34 and 36 concentric with the axis 18 and which are engaged for rolling contact by oppositely convergent conical traction surfaces 38 and 40 on the beta body 20 at two diametrically opposite points of contact P1 and P2. A pinion gear 42 at one end of the beta body 20 meshes with a ring gear 44 integrally formed with a shaft 46 supported from the alpha body 12 by a bearing 48 and from the frame 10 by a bearing 50 for rotation on the primary axis 18.

In the operation of the transmission embodiment in FIG. 1, an input torque applied to the alpha body 12 through an input shaft 52 drives the alpha body in rotation to carry the beta body 20 in nutation and so that the conical traction surfaces 38 and 40 roll on the ring traction surfaces 34 and 36 to develop relative rotation between the beta body 20 and the alpha body 12. The output shaft 46 is rotatably driven as a result of its meshing engagement with the pinion gear 42 under the combined nutating movement of the beta body 20 about the axis 18 and rotatable movement of the beta body 20 on the axis 26. Speed ratio variation is achieved by moving the rings 28 and 30 axially toward or away from each other in symmetry with the point S to vary the radius ratio of the rings and the conical surfaces at the contact points P1 and P2. The development of normal forces for retaining the conical surfaces 38 and 40 in engagement with the ring surfaces 34 and 36 is effected by means (not shown) operating to separate the conical surfaces forcibly along the second axis 26. Also, and although referred to as "points" herein, the contact points P1 and P2 are, in reality, areas of contact due to compression of the cones and rings under the normal forces developed in torque transmitting operation.

To lubricate and cool working components of the transmission contained within the frame 10, a liquid lubricant is circulated by a pump 54 from a sump 56 or equivalent to which the lubricant within the housing 10 passes by gravity through a flow line 58. The lubricant may be any of several traction lubricants which behave in the manner of engine oil under normal pressures and temperatures but when subjected to rolling pressures of the magnitude existing at the contact points P1 and P2, exhibit an increase in viscosity to a point of reaching a glassy solid state capable of high shear rates. The lubricant returns immediately to its liquid state and normal physical properties when freed from the rolling contact points or areas. To ensure proper distribution of the lubricant within the housing 10, the discharge of the pump 54 is through a pipe 60 to a manifold 62 to an internal supply port 64 in the alpha body 12. The supply port 64 is connected with several branch ports 66, 68, 70, and 72 to be described in more detail below.

Figure 2:
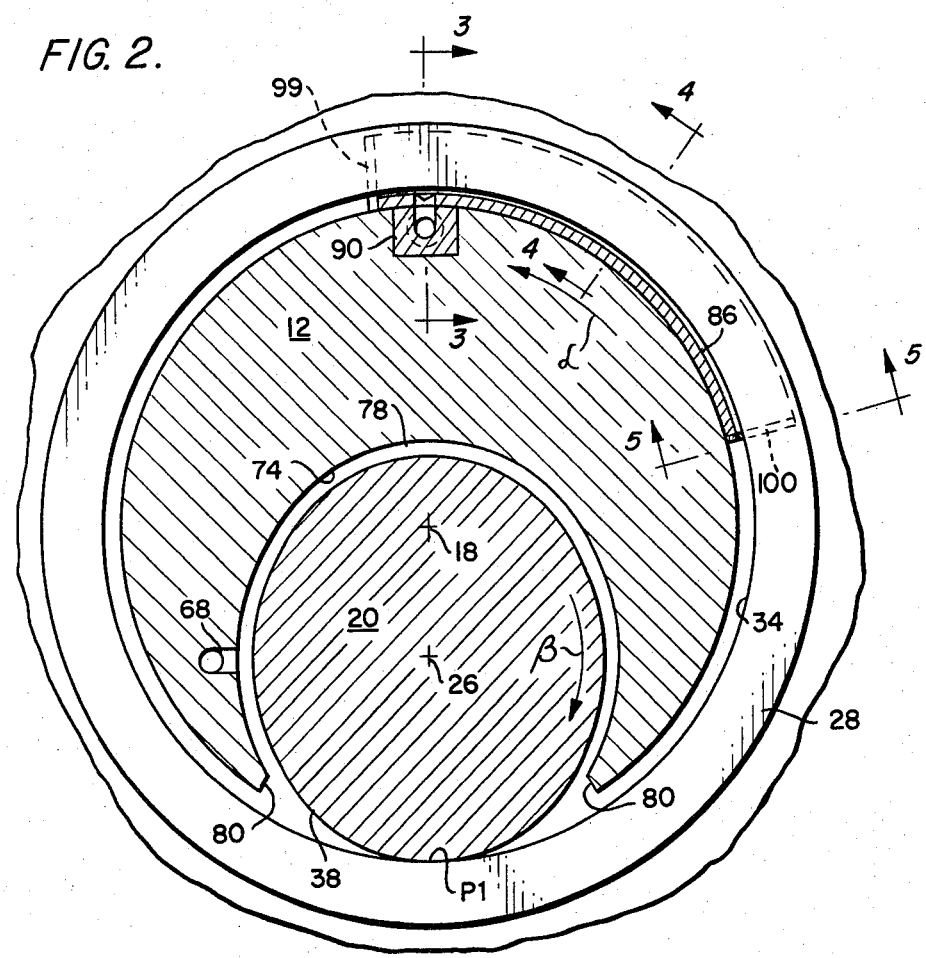
FIG. 2 is an enlarged fragmentary cross-section on line 2—2 of FIG. 1.

As may be seen in FIGS. 1 and 2 of the drawings, the alpha body 12 is in the nature of a truncated cylinder defining frusto-conical pockets 74 and 76 for receiving oppositely convergent conical portions in the beta body 20. The inner surface of the pockets 74 and 76 are spaced from the traction surfaces 38 and 40 on the beta body, respectively, to provide clearance spaces 78. The pockets 74 and 76 open at windows to allow contact of the conical surfaces 38 and 40 with the rings 28 and 30, the edges of such windows being shown in FIGS. 1 and 2 and designated by the numeral 80. In accordance with the disclosure of the aforementioned U.S. Pat. No. 4,235,127, the pockets 74 and 76 are preferably provided with wiping pads or blades (not shown) to cleanse the surfaces 38 and 40 of lubricant to enhance cooling.

In most applications of transmissions of the type shown in FIGS. 1 and 2, driving torque at the input shaft 52 will be unidirectional and will determine the direction of alpha body rotation which in FIG. 2 is indicated by the arrow $\alpha$. For such rotation of the alpha body, the rotation of the beta body 20 relative to alpha body movement will be in the direction of the arrow $\beta$.

In accordance with the present invention, the internal traction surfaces 34 and 36 on the rings 28 and 30 are cooled in substantially the same manner as the conical traction surfaces 38 and 40. To this end, arcuate trough members 86 and 88 are positioned in the radial space between the outside of the alpha body 12 and the ring traction surfaces 34 and 36. The trough members are carried rotatably by the alpha body 12 as a result of an inward radial projection 90 on each trough engaging in an axial slot 92 extending along the outer edge of the alpha body 12. The axial slots allow the trough members to move axially with the rings 28 and 30. As shown in FIG. 1, slide pipes 94 are connected to the inward projections 90 and communicate respectively with branch ports 66 and 72 in the alpha body 12.

Figure 3:
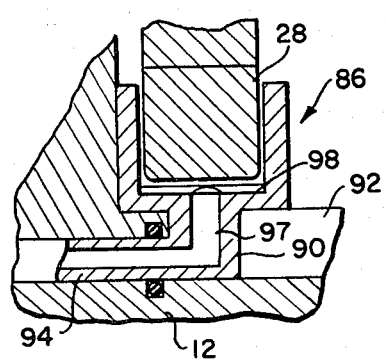
FIG. 3 is an enlarged fragmentary cross-section on line 3—3 of FIG. 2.
Figure 4:
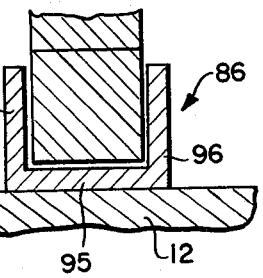
FIG. 4 is a similarly enlarged fragmentary cross-section on line 4—4 of FIG. 2.
Figure 5:
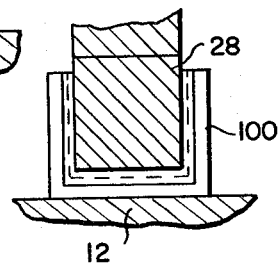
FIG. 5 is a cross-section on line 5—5 of FIG. 2.

The trough members are identical and as may be seen most clearly in FIGS. 2-5 of the drawings, the trough member 86 is of generally U-shaped radial cross-section to define an axial base 95 between a pair of radial flanges 96. The trough is dimensioned so that the inner axial and radial surfaces provide a clearance space with the traction surfaces 34 and 36 as well as with the radial side surfaces of the ring 28. Further and as shown in FIGS. 2 and 3, lubricant supplied through the slide pipe 94 and projection 90 enters the trough through an inlet port 97 near the leading end thereof in the context of its movement relative to the ring 28. A transverse groove 98 intersection the point of lubricant introduction to the trough assures a flooding of the ring surfaces enveloped by the trough. As in the case of the conical traction surfaces 38 and 40, the leading end of the trough is provided with a wiping pad 99 whereas the trailing end of the trough is provided with a similar wiping pad 100. The pad 99 assures a lubricant free surface for recirculated cooling lubricant introduced into the trough whereas the wiping pad 100 prevents an excessive buildup of lubricant on the traction surface 34 as it approaches the contact point P1.

Figure 6:
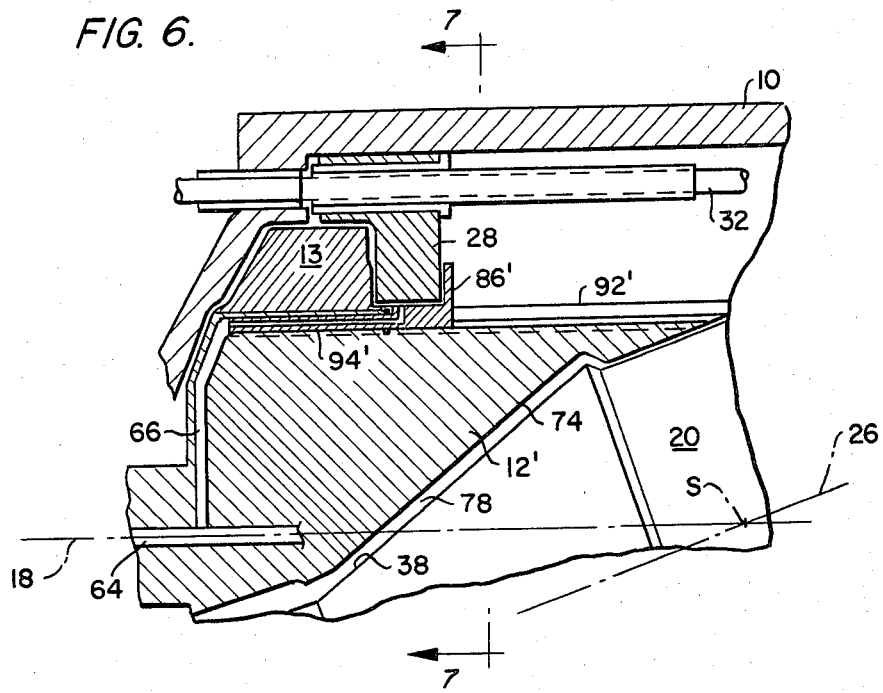
FIG. 6 is a fragmentary cross-section comparable to FIG. 1, but illustrating a modified embodiment of the invention.
Figure 7:
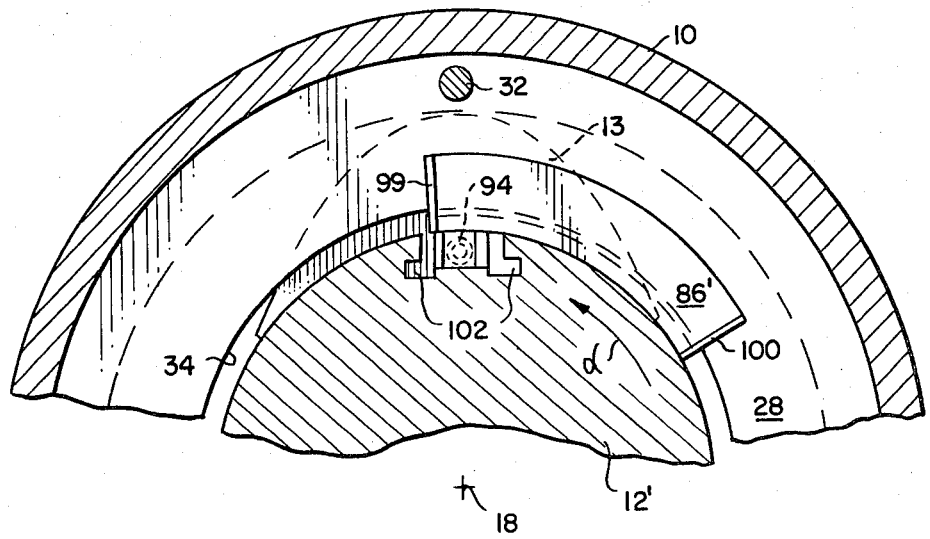
FIG. 7 is an enlarged fragmentary cross-section on line 7—7 of FIG. 6.

In FIGS. 6 and 7, an alternative embodiment of the invention is shown in which parts identical to parts previously described are designated by the same reference numerals whereas parts having the same function but differing slightly in structure are designated by the same reference numerals but primed. The embodiments of FIGS. 6 and 7 is related in part to the disclosure of a commonly assigned U.S. Pat. No. 4,258,581 issued Mar. 31, 1981. In that patent, a pair of slidable counterweights are carried by the alpha body for axial movement with the rings 28 and 30 to adjustably counterbalance variable inertial forces exhibited in transmissions of the general type shown in FIG. 1. Thus in FIGS. 6 and 7, one of two such slidable counterweights is designated by the numeral 13 and shown to include a pair of spaced, L-shaped legs 102 slidably retained in the groove 92' which is undercut in this embodiment to complement the legs 102. The counterweight 13 is fixed to or integrated with the trough member 86' to which coolant is supplied in the same manner as in the embodiment of FIGS. 1–5. The trough member 86' thus serves the dual functions of both circulating coolant over a sector of the ring and connecting the counterweight 13 for direct axial movement with the ring.

Although application of the present invention is intended principally to transmissions of the type disclosed, the invention is applicable to other types of traction drive transmissions in which one or more rolling traction surfaces are carried about the inside of an axially movable ring. It is expressly intended, therefore, that the foregoing description and accompanying drawings are representative of a preferred embodiment and thus illustrative only, not limiting, and that the true spirit and scope of the present invention will be determined by reference to the appended claims.

I claim:

1. In a traction drive torque transmission having a closed housing, an alpha body supported in said housing for rotation about a first axis, a beta body supported for relative rotation from said alpha body on a second axis inclined with respect to and intersecting said first axis at a point of axes intersection, said beta body defining a pair of conical traction surfaces concentric with said second axis, one on each side of said point of axes intersection, a pair of rings defining inside traction surfaces of revolution about said first axis and shiftable axially toward and away from each other, said conical traction surfaces being in rolling friction engagement with said inside traction surfaces at two diametrically opposite points of contact, the improvement comprising:
   means carried rotatably by said alpha body to define clearance spaces extending arcuately through a defined sector of and adjacent to each said conical traction surfaces and said inside traction surfaces, respectively; and
   means for circulating a traction lubricant through both of said clearance spaces.

2. The apparatus recited in claim 1, including wiping means at opposite ends of each of said sectors.

3. The apparatus recited in claim 1, wherein said circulating means comprises an inlet port near the entrance of each of said traction surfaces into said clearance spaces respectively.

4. The apparatus recited in claim 1, wherein said means to define the clearance space adjacent to said inside traction surfaces comprises trough members enclosing said rings about said inside traction surfaces and outwardly along the radial end surfaces of said rings.

5. The apparatus recited in claim 4, wherein said trough members are movable axially on said alpha body.

6. The apparatus recited in claim 5, including a pair of slidable counterweights carried by said alpha body, said trough members being fixed to said counterweights thereby to connect said counterweights for axial movement directly with said rings.

7. Apparatus for cooling an inside traction surface on a ring in a traction drive transmission having rotatable working components including an outside traction surface in rolling friction engagement with the inside traction surface at a contact point, said apparatus comprising:
   a trough member carried rotatably with said working components and extending arcuately through a ring sector spaced from the point of rolling friction engagement, said trough member defining a clearance space with the inside traction surface; and
   means for supplying a coolant to said clearance space.

8. The apparatus recited in claim 7, wherein said trough member is of U-shaped radial cross-section and dimensioned to provide axial and radial clearance spaces with the inside and radial surfaces of the ring.

9. The apparatus recited in claim 7, wherein said trough member includes leading and trailing ends in the context of relative movement with respect to the ring, said coolant supplying means comprising an inlet port near said leading end.

10. The apparatus recited in claim 9, including a transverse groove on the inside axial surface of said trough and intersecting said inlet port.

11. The apparatus recited in claim 9, including means for wiping said ring at said leading end of said trough member.

12. The apparatus recited in claim 11, including means for wiping said ring also at said trailing end of said trough member.

13. The method of cooling a traction surface in a traction drive transmission having at least two such traction surfaces in rolling surface engagement at a contact point, said method comprising the steps of:
   circulating a traction lubricant over a defined sector of the traction surface, said sector being spaced from the contact point of rolling friction engagement;
   wiping the traction surface at the leading edge of said sector to cleanse the surface for contact by freshly circulated lubricant; and
   wiping the traction surface at the trailing edge of said sector to reduce the thickness of lubricant film remaining on the surface in advance of the contact point.

14. The method recited in claim 13, wherein the traction surface is a stationary internal surface and comprising the step of rotating said sector relative to the traction surface.

15. The method recited in either of claims 13 or 14, wherein the traction surface is an axial surface on the inside of a ring having radial end surfaces and including the step of circulating the lubricant over said axial and radial surfaces throughout said sector.

* * * * *